United States Patent
Mori

(10) Patent No.: US 7,432,965 B2
(45) Date of Patent: Oct. 7, 2008

(54) BLACK LEVEL CORRECTING DEVICE AND ELECTRONIC CAMERA

(75) Inventor: Yoshizo Mori, Odawara (JP)

(73) Assignee: Nikon Corporation, Tokyo (JP)

( * ) Notice: Subject to any disclaimer, the term of this patent is extended or adjusted under 35 U.S.C. 154(b) by 606 days.

(21) Appl. No.: 10/922,849

(22) Filed: Aug. 23, 2004

(65) Prior Publication Data

US 2005/0094009 A1 May 5, 2005

(30) Foreign Application Priority Data

Sep. 4, 2003 (JP) ............................. 2003-312238

(51) Int. Cl.
- H04N 9/64 (2006.01)
- H04N 5/16 (2006.01)
- H04N 1/40 (2006.01)
- H04N 1/38 (2006.01)
- G06K 9/38 (2006.01)

(52) U.S. Cl. ...................... 348/243; 348/245; 348/248; 348/251; 348/257; 358/461; 358/463; 382/270

(58) Field of Classification Search ................ 348/245, 348/243, 248, 251, 257, 697; 358/461, 463; 382/270

See application file for complete search history.

(56) References Cited

U.S. PATENT DOCUMENTS 5,283,655 A * 2/1994 Usami ........................ 348/257
5,410,365 A * 4/1995 Nakamura et al. ........... 348/697
5,512,947 A * 4/1996 Sawachi et al. .............. 348/243
5,659,355 A * 8/1997 Barron et al. ................ 348/245
6,720,999 B1 * 4/2004 Holberg et al. .............. 348/257
6,774,941 B1 * 8/2004 Boisvert et al. .............. 348/243
6,774,942 B1 * 8/2004 Salcedo et al. .............. 348/243
6,791,607 B1 * 9/2004 Bilhan et al. ................. 348/243
2002/0033891 A1 * 3/2002 Ying et al. ................... 348/243

FOREIGN PATENT DOCUMENTS

| JP | A 5-153429 | 6/1993 |
| JP | A 2000-278616 | 10/2000 |

* cited by examiner

Primary Examiner—Nhan T Tran
(74) Attorney, Agent, or Firm—Oliff & Berridge, PLC

(57) ABSTRACT

A black level correcting device includes: an A/D converting section converting a result of subtracting a feedback signal from an input pixel signal into a pixel value to be output; and a feedback controlling section generating the feedback signal and having a holding section, a feedback gain adjusting section, etc. The holding section clamps a maintaining level to the level of the feedback signal while pixel signals of OB pixels are output, and maintains and outputs the maintaining level while pixel signals of valid pixels are output. The feedback gain adjusting section multiplies the feedback signal by clamp accelerating gain in synchronization with starting readout of the pixel signals from the OB pixels. Accordingly, clamp time of the holding section is shortened, enabling stabilization of the maintaining level at a convergence level before starting readout of the pixel signals from the valid pixels. Consequently, a sag can be reduced.

4 Claims, 5 Drawing Sheets

BLACK LEVEL CORRECTING DEVICE AND ELECTRONIC CAMERA

CROSS-REFERENCE TO RELATED APPLICATIONS

This application is based upon and claims the benefit of priority from Japanese Patent Application No. 2003-312238, filed on Sep. 4, 2003, the entire contents of which are incorporated herein by reference.

BACKGROUND OF THE INVENTION

1. Field of the Invention

The present invention relates to technologies for determining a black level in an image signal.

2. Description of the Related Art

An image sensor generally has pixels shielded from light (optical black, hereinafter called OB pixels). A pixel signal output from this OB pixel is used for determining a signal level corresponding to black (hereinafter called a black level) (refer to, for example, Japanese Unexamined Patent Application Publication No. Hei 5-153429).

FIG. 1 is a block diagram showing an example of a conventional black level correcting device. As shown in the drawing, a black level correcting device 10 has a subtracter 12, a programmable amplifier 14 (a programmable gain amplifier, hereinafter abbreviated as PGA), a hold circuit 16, an A/D converter 18, a D/A converter 20, a reference setting section 24, a comparator 26, a switch 28, a sampling and holding section 32, and a subtracter 36.

The circuit operation of the black level correcting device 10 will be hereinafter described. To make description easier, a pixel except for the OB pixel, that is, a pixel for generating and accumulating signal charge in accordance with an amount of received light is written as "valid pixel" in this specification. After the subtracter 12 subtracts a signal level held by the hold circuit 16 (hereinafter called a hold level, described later in detail) from an analog pixel signal output from an image sensor 40, the PGA 14 amplifies the analog pixel signal. After that, the A/D converter 18 converts the pixel signal into a digital pixel value, and then the pixel value is input into the comparator 26, the sampling and holding section 32 and the subtracter 36.

The reference setting section 24 inputs a reference value (positive value) into the comparator 26. The reference value is a target value which indicates how much value a pixel signal of the OB pixel is expected to be just after A/D conversion. The comparator 26 outputs a result of subtracting the reference value from the pixel value. The switch 28 is turned on only when a pixel signal from a first OB pixel area in the image sensor 40 is input into the subtracter 12 (when an OB timing signal 1 in the drawing is at a high level).

When the switch 28 is on, the pixel value output from the comparator 26 is input into the D/A converter 20 to be converted into an analog signal, and then the analog signal is input into the hold circuit 16. The hold circuit 16 brings its hold level to an input signal level. The subtracter 12 subtracts the hold level from a pixel signal input from the image sensor 40. This operation is carried out in both cases where the pixel signals from the OB pixels of the image sensor 40 are output and where pixel signals of the valid pixels are output.

Since a negative feedback loop is formed by the subtracter 12 as described above, each pixel signal from the OB pixels is controlled so as to be ultimately converted into a pixel value equal to the reference value by A/D conversion. In other words, a convergence level of the hold level is a level of an analog signal obtained by converting, into an analog signal, "a value subtracting the reference value from a value into which each pixel signal of the OB pixels is simply converted by A/D conversion". Here, "the value simply converted by the A/D conversion" is a value obtained in such a case where the pixel signals of the OB pixels are input into the A/D converter 18 through the PGA 14 without any subtraction by the subtracter 12 and converted by the A/D conversion.

Thus, the pixel value output from the A/D converter 18 is so controlled that the vicinity of the reference value becomes the black level (an average level of the pixel signals from the OB pixels). Therefore, it is prevented that a pixel signal in the vicinity of the black level is clipped to zero just after the A/D conversion. When a pixel signal from a second OB pixel area in the image sensor 40 is input into the subtracter 12 (an OB timing signal 2 in the drawing is at a high level), the sampling and holding section 32 holds a pixel value input from the A/D converter 18. The subtracter 36 subtracts the pixel value held by the sampling and holding section 32 from pixel values input from the A/D converter 18 to output results to a subsequent stage. The black level correcting device 10, as described above, makes the analog pixel signals input from the image sensor 40 into the digital pixel values having a black level of zero, and outputs them to the subsequent stage.

Since a circuit for processing an analog signal like this needs certain time to output a stable signal after the circuit is in an operating state, it is necessary to make the circuit in the operating state before taking a photograph. Thus, even in a state where no line is selected for reading out pixel signals, each switch of a vertical transfer section, a horizontal transfer section and the like in the image sensor 40 are turned on. Accordingly, the black level correcting device 10 is also operated to output a signal irrelevant to a photographed image (refer to, for example, Japanese Unexamined Patent Application Publication No. 2000-278616). This operation will be hereinafter called idling operation.

In a conventional method described above, the feedback for black level correction is always carried out irrespective of whether or not pixel signals after exposure are read out of the image sensor 40. Thus, if a signal level of the OB pixels during the idling operation is different from a signal level of the OB pixels at the start of readout after the exposure, the convergence level of the hold level during the idling operation differs from that during the readout of the pixel signals after the exposure. Therefore, when the readout of the pixel signals after the exposure is started, the hold level changes from "(the signal level of the OB pixels during the idling operation)—(a signal level into which the reference value is converted by D/A conversion)" to "(the signal level of the OB pixels after the exposure)—(the signal level into which the reference value is converted by the D/A conversion)". It needs time, however, to change the hold level of the hold circuit 16 and stabilize the hold level to the convergence level.

Thus, at the start of the readout of the pixel signals after the exposure, the hold level of the hold circuit 16 is in a transitional state and varies. As a result, there is a problem of the occurrence of a sag (a direct-current standard level in the image signal varies because a time constant of a path is short).

Also, it is necessary to subtract the reference value added by the subtracter 12 in a previous stage for the purpose of preventing a pixel signal in the vicinity of the black level from being clipped to zero just after A/D conversion, in the subsequent stage. If the sag occurs, however, the reference value cannot be subtracted as-is. Thus, it becomes necessary to subtract the reference value after the sampling and holding section 32 samples variation in the level again (digital clamp). As a result, there is a problem that the structure of the circuit is complicated.

SUMMARY OF THE INVENTION

An object of the present invention is to reduce a sag in a device for determining a black level of an image signal output from an image sensor, and an electronic camera in which this device is installed.

Another object of the present invention is to simplify the structure of a circuit in a device for determining a black level of an image signal output from an image sensor.

A black level correcting device according to the present invention includes an A/D converting section and a feedback controlling section. The A/D converting section converts a result of subtracting a feedback signal from an analog pixel signal output from an image sensor into a digital signal, and outputs the digital signal as a pixel value. The feedback controlling section generates the feedback signal. In the present invention, the feedback controlling section includes a comparator, a holding section, a subtracting section, and a feedback gain adjusting section. The comparator outputs a difference between a standard value and the pixel value output from the A/D converting section as a digital feedback signal. The holding section having a maintaining section carries out clamp operation, which brings a maintaining level of the maintaining section near to a level of the feedback signal in response to the feedback signal output from the comparator, while a pixel signal from an optical black pixel of the image sensor is output. The holding section maintains and outputs the maintaining level of the maintaining section while a pixel signal from a valid pixel of the image sensor is output. The subtracting section subtracts the maintaining level of the holding section from the analog pixel signal before the analog pixel signal is input into the A/D converting section. The feedback gain adjusting section, which is inserted into a feedback loop of the feedback signal in series, starts to multiply the feedback signal by clamp accelerating gain which is larger than 1 in synchronization with starting the readout of the pixel signal from the optical black pixel, and multiplies the feedback signal by gain which is smaller than the clamp accelerating gain before the completion of the clamp operation.

Therefore, according to the present invention, it is possible to expect the effect of shortening clamp time of the holding section, and stabilizing the maintaining level at a convergence level before starting the readout of the pixel signals from the valid pixels. As a result, it is possible to expect reduction in a sag.

The foregoing holding section refers to, for example, a combination of a hold circuit, a D/A converter, and a switch. The feedback gain adjusting section refers to, for example, a PGA. The feedback controlling section refers to, for example, a combination of a subtracter, the hold circuit, the D/A converter, the switch, the PGA, and a comparator. The standard value is also called a reference value.

It is preferable that the black level correcting device according to the present invention has a standard value subtracting section having the following function. This standard value subtracting section subtracts the standard value from the pixel value output from the A/D converting section, and outputs the pixel value after subtraction as a black level-controlled pixel value. In this embodiment, the simplification of the structure of a circuit can be expected.

An electronic camera according to the present invention includes an image sensor, and a signal processing section which takes an image of a subject using the image sensor to generate image data. In the electronic camera according to the present invention, the signal processing section has a black level correcting device for processing an analog pixel signal output from the image sensor. This black level correcting device includes an A/D converting section and a feedback controlling section. The A/D converting section converts a result of subtracting a feedback signal from the analog pixel signal output from the image sensor into a digital signal, and outputs the digital signal as a pixel value. The feedback controlling section generates the feedback signal. In the electronic camera according to the present invention, the feedback controlling section includes a comparator, a holding section, a subtracting section, and a feedback gain adjusting section. The comparator outputs a difference between a standard value and the pixel value output from the A/D converting section as the digital feedback signal. The holding section having a maintaining section carries out clamp operation, which brings a maintaining level of the maintaining section near to a level of the feedback signal in response to the feedback signal output from the comparator, while a pixel signal from an optical black pixel of the image sensor is output. The holding section maintains and outputs the maintaining level of the maintaining section, while a pixel signal from a valid pixel of the image sensor is output. The subtracting section subtracts the maintaining level of the holding section from an analog pixel signal, before the analog pixel signal is input into the A/D converting section. The feedback gain adjusting section, which is inserted into a feedback loop of the feedback signal in series, starts to multiply the feedback signal by clamp accelerating gain which is larger than 1 in synchronization with starting the readout of the pixel signal from the optical black pixel, and multiplies the feedback signal by gain which is smaller than the clamp accelerating gain before the completion of the clamp operation.

The foregoing signal processing section refers to, for example, the black level correcting device, a timing generator, an image processing section, and the function of an MPU, which commands the black level correcting device, the timing generator, the image processing section, and the image sensor to carry out imaging operation to generate image data.

In the electronic camera according to the present invention, it is preferable that the black level correcting device, being a component of the electronic camera, has a standard value subtracting section having the following function. This standard value subtracting section subtracts the standard value from a pixel value output from the A/D converting section, and outputs the pixel value after subtraction as a black level-controlled pixel value.

The nature, principle, and utility of the invention will become more apparent from the following detailed description when read in conjunction with the accompanying drawings.

DESCRIPTION OF THE PREFERRED EMBODIMENT

An embodiment of the present invention will be hereinafter described with reference to the drawings. The same reference numbers as in the conventional art refer to identical components.

<Structure of this Embodiment>

Figure 2:
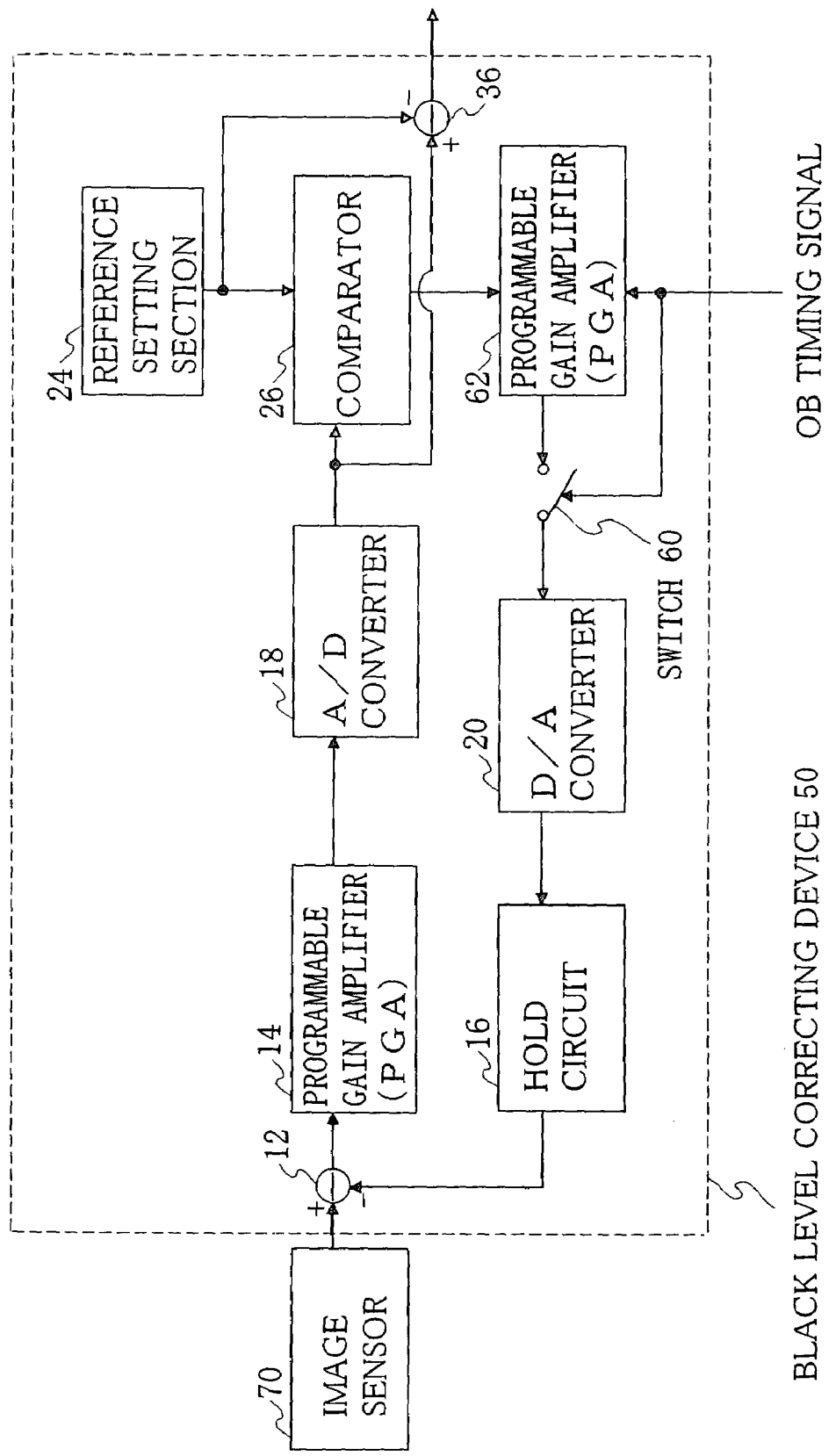
FIG. 2 is a block diagram of a black level correcting device according to an embodiment.

FIG. 2 is a block diagram of a black level correcting device according to this embodiment. A black level correcting device 50 has a subtracter 12, a PGA 14, a hold circuit 16, an A/D converter 18, a D/A converter 20, a switch 60, a PGA 62, a comparator 26, a reference setting section 24, and a subtracter 36. The function of each part of the black level correcting device 50 will be hereinafter described.

The subtracter 12 receives an analog pixel signal from an image sensor 70, and subtracts a hold level of the hold circuit 16 from the pixel signal to input the result into the PGA 14.

The PGA 14 amplifies the input analog pixel signal, and inputs the amplified pixel signal into the A/D converter 18.

The A/D converter 18 converts the input pixel signal to a digital pixel value, and inputs the pixel value into the comparator 26 and the subtracter 36.

The reference setting section 24 inputs a reference value (positive value) into the comparator 26 and the subtracter 36. The reference value is a target value which indicates how much value each pixel signal from OB pixels of the image sensor 70 is expected to be just after A/D conversion. The comparator 26 inputs a result of subtracting the reference value from the pixel value into the PGA 62.

When pixel signals from the OB pixels of the image sensor 70 are input into the subtracter 12 (when an OB timing signal in the drawing is at a high level), the PGA 62 changes gain in accordance with an input pixel value to shorten clamp time of the hold circuit 16. The details of this operation will be described later.

The switch 60 is turned on only over a period when the pixel signals from the OB pixels are input into the subtracter 12, in order to input the pixel values from the PGA 62 into the D/A converter 20.

The D/A converter 20 converts the input pixel value into an analog signal, and inputs the analog signal into the hold circuit 16.

The hold circuit 16 brings its hold level near to an input signal level, while the switch 60 is on. When the switch 60 is turned off, the hold circuit 16 holds and keeps outputting the hold level. The subtracter 12 subtracts the hold level from an analog pixel signal input from the image sensor 70. This operation is carried out in both cases where pixel signals from the OB pixels are input and where pixel signals from valid pixels are input. The subtracter 36 (also called a standard value subtracting section in the present invention) subtracts the reference value from a pixel value input from the A/D converter 18 and outputs a result to a subsequent stage.

In FIG. 2, a signal path routed through the comparator 26, the PGA 62, the switch 60, the D/A converter 20, the hold circuit 16, and the subtracter 12 in this order is also referred to as a feedback loop in the present invention. A signal which is output from the comparator 26 as a pixel value and input into the subtracter 12 from the hold circuit 16 through the PGA 62 and the D/A converter 20 is referred to as a feedback signal in the present invention.

<Clamp Accelerating Operation of this Embodiment>

Before the explanation of clamp accelerating operation by the PGA 62, the structure of the image sensor 70 will be briefly described to explain order of reading out pixels, which is necessary for explaining the clamp accelerating operation.

The image sensor 70 has pixels with "m" rows and "n" columns in the form of, for example, a Bayer pattern, "n" number of vertical CCDs which are formed for each column, a horizontal CCD, and a reading amplifier (not illustrated). Signal charge (pixel output) generated by each pixel is first transferred to the vertical CCD. The "n" number of vertical CCDs successively transfer the pixel output to the horizontal CCD on a row basis. The horizontal CCD successively transfers the transferred pixel output to the reading amplifier. Then, the reading amplifier inputs the transferred pixel output to the subtracter 12 of the black level correcting device 50 as analog pixel signals.

To simplify the explanation, OB pixels in an upper portion and the like are not considered in this embodiment, and it is assumed that of all the pixels in each row (the number of pixels is "n"), a few pixels read out first are OB pixels (lateral OB) and the rest are valid pixels. Therefore, signals are read out in order of the OB pixels in a first row, the valid pixels in the first row, the OB pixels in a second row and the valid pixels in the second row . . . .

Figure 3:
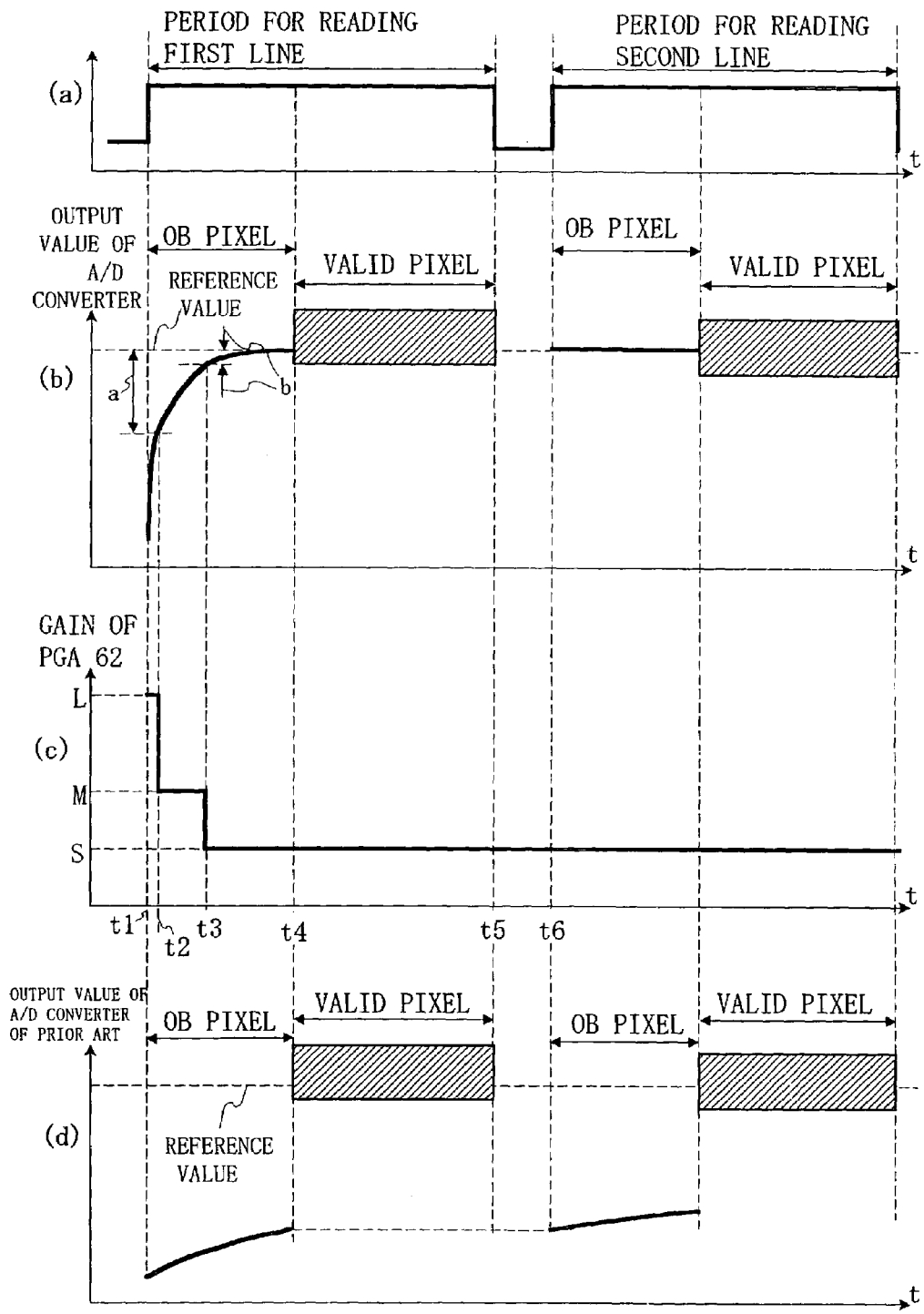
FIG. 3 is an example of a timing chart showing gain of a PGA 62 of FIG. 2.

FIG. 3 is a timing chart showing gain of the PGA 62. FIG. 3(a) shows a readout period of each row. FIG. 3(b) shows a pixel value output from the A/D converter 18, and FIG. 3(c) shows variation in the gain of the PGA 62. The operation of the PGA 62 will be hereinafter described with the use of timing of times t1 to t6 shown in the drawing. In this embodiment, idling operation is not carried out before reading out pixel signals from the OB pixels in the first row.

At the time t1, the pixel signals from the OB pixels in the first row start being input into the subtracter 12. In synchronization with this, the OB timing signal is changed into high level, and the switch 60 is turned on. This time is the start of a clamp, so that the hold level of the hold circuit 16 has not reached a convergence level.

Since the subtracter 12 forms a negative feedback loop, the convergence level of the hold level is a level of an analog signal obtained by converting, into an analog signal, "a value subtracting the reference value from a value into which each pixel signal of the OB pixels is simply converted by A/D conversion". Here, "the value simply converted by the A/D conversion" is a value obtained in such a case where the pixel signals of the OB pixels are input into the A/D converter 18 through the PGA 14 without any subtraction by the subtracter 12 and converted by the A/D conversion. The absolute value of a pixel value output from the comparator 26 is at the maximum at the start of the clamp, and is reduced as the hold level approaches the convergence level. The absolute value of the pixel value becomes zero when the hold level reaches the convergence level.

Accordingly, as shown in FIG. 3(b), at the time t1, the difference between a pixel value output from the A/D converter 18 and the reference value, that is, the absolute value of a pixel value output from the comparator 26 is equal to or more than a predetermined value "a" (positive value). In this embodiment, by way of example, the predetermined value "a" is a value in which the difference between the pixel value output from the A/D converter 18 and the reference value becomes 50% of the reference value, when the reference value is regarded as a standard (100%).

While the absolute value of the pixel value output from the comparator 26 is equal to or more than the predetermined value "a", the PGA 62, as shown in FIG. 3(c), brings the gain to "L" (value at least larger than 1). A gain "L" is a value which is large to such an extent as to sufficiently shorten the clamp time, and is, for example, 16. The clamp time is time from the start of inputting the pixel signals of the OB pixels in the first row into the subtracter 12 till the hold level reaches the convergence level.

To be more specific, the hold circuit 16 is composed of, for example, a publicly known time constant circuit (not illustrated). Namely, a charging voltage of a capacitor in the time constant circuit is brought near to an input voltage level during a sample period (a period in which the switch 60 is on, in this embodiment). The charging voltage of the capacitor is held and kept being output during a hold period (a period in which the switch 60 is off, in this embodiment). The capacitor is also called a maintaining section in the present invention. The charging voltage of the capacitor is also called a maintaining level in the present invention, and corresponds to the hold level of this embodiment.

The larger the difference between the input level and the charging voltage of the capacitor in the sample period is, the more sharply the charging voltage of the capacitor increases or decreases. Thus, by making the gain of the PGA 62 high at the start of the clamp of the hold circuit 16, the charging voltage of the capacitor of the hold circuit 16 rapidly varies because it is assumed that the pixel value output from the comparator 26 is large. As a result, the clamp time of the hold circuit 16 is shortened.

Next, at the time t2, the absolute value of the pixel value output from the comparator 26 becomes less than the predetermined value "a". In synchronization with this, the PGA 62 reduces the gain from "L" to "M". The gain ""M" is a value, for example, 8 which is larger than 1 and smaller than the gain "L". The PGA 62 maintains the gain at "M" in a period of time when the absolute value of the pixel value output from the comparator 26 is equal to or more than a predetermined value "b" and less than the predetermined value "a". This gain "M" and the foregoing gain "L" are also called clamp accelerating gain in the present invention.

Then, at the time t3, the absolute value of the pixel value output from the comparator 26 becomes less than the predetermined value "b" (positive value less than the predetermined value "a"). In synchronization with this, the PGA 62 lowers its gain to "S" (for example, 4). By way of example, in this embodiment, the predetermined value "b" is a value in which the difference between the pixel value output from the A/D converter 18 and the reference value becomes 15% of the reference value, when the reference value is regarded as a standard (100%). After that, the hold level reaches the convergence level, and the pixel value output from the comparator 26 becomes zero. The moment when the hold level reaches the convergence level means "the completion of the clamp operation".

Then, at the time t4, the readout of the pixel signals from the OB pixels in the first row is completed, the pixel signals from the valid pixels in the first row start being input into the subtracter 12. In synchronization with this, the OB timing signal is changed into a low level, so that the switch 60 is turned off. While the switch 60 is off, the hold circuit 16 maintains and keeps outputting its hold level. The PGA 62 keeps its gain at "S" while the switch 60 is off. Since the switch 60 is off, the operation of the circuit does not change even if the gain of the PGA 62 is set at any value.

Then, at the time t5, the readout of the pixel signals from the valid pixels in the first row is completed.

Then, at the time t6, pixel signals from the OB pixels in the second row start being input into the subtracter 12. In synchronization with this, the OB timing signal changes into the high level, and the switch 60 is turned on. At this time, the hold level has already reached the convergence level. Thus, the PGA 62 keeps the gain at "S".

The PGA 62 shortens the clamp time of the hold circuit 16 by changing the gain as described above. Thus, the hold level of the hold circuit 16 is stabilized at the convergence level before completing the readout of the pixel signals from all of the OB pixels in the first row. Therefore, a pixel signal of the black level (an average level of the pixel signals from the OB pixels) is output from the A/D converter 18 as a pixel value which is equal to the reference value.

A sag does not occur because the hold level is rapidly stabilized at the convergence level. Accordingly, the pixel signal from the image sensor 70 is changed into a pixel value with a black level of zero, by means of subtracting the reference value from the pixel value output from the A/D converter 18 by the subtracter 36 in the subsequent stage, as shown in FIG. 2.

Figure 1:
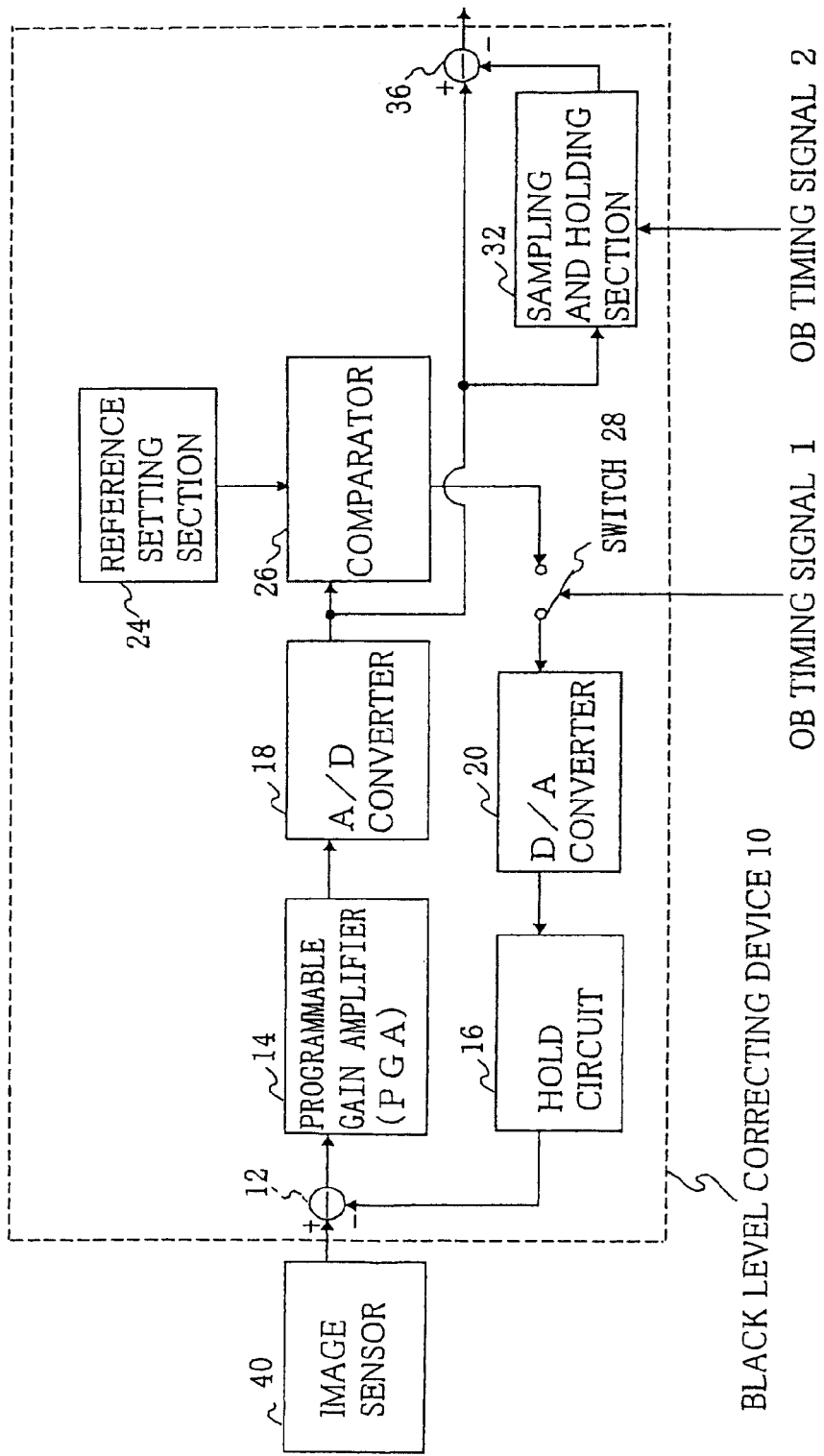
FIG. 1 is an example of a block diagram of a conventional black level correcting device.

For comparison, FIG. 3($d$) shows a pixel value output from an A/D converter 18 in a case where pixel signals of an image sensor 70 are read out similarly to above by use of a conventional black level correcting device 10 shown in FIG. 1. In the conventional black level correcting device 10, as shown in FIG. 3($d$), clamping is not completed at the time t4 when the readout of the pixel signals from the OB pixels in the first row is completed, and even at a time when the readout of the pixel signals from the OB pixels from the second row is completed. Therefore, there are problems that the valid pixels in at least first, second, and third rows are changed into pixel values having different black levels from one another and the like.

<Effect of this Embodiment>

In this embodiment, the PGA 62 gradually reduces its gain after increasing the gain just after the start of the clamping. Accordingly, it is possible to greatly shorten the clamp time (convergence time) of the hold circuit 16. Thus, even if the number of the OB pixels in each row is small, it is possible to stabilize the hold level of the hold circuit 16 at the convergence level before starting the readout of the pixel signals from the valid pixels. As a result of this, the sag hardly occurs. Also, since it is unnecessary to carry out the idling operation before reading out the pixel signals after exposure, circuit stability time can be shortened. Therefore, installing the black level correcting device 50 according to this embodiment in an electronic camera makes it possible to shorten a release time lag compared to the conventional art.

Furthermore, the gain of the PGA 62 is reduced just before convergence. Thus, it does not occur that noise in the pixel signals from the OB pixels is amplified just before the convergence and the hold level of the hold circuit 16 varies. Accordingly, it is possible to precisely correct the black level. Therefore, since banding noise is reduced, it is possible to improve image quality.

In the case of long-term exposure, a direct-current level of the pixel signal of the OB pixel, being a noise component, is increased. Also in such a case, however, it is possible to precisely correct the black level as described above. In other words, after a pixel value is output from the A/D converter 18 in such a manner that an average level of pixel signals of the OB pixels precisely becomes the reference value, the subtracter 36 in the subsequent stage subtracts the reference value from the pixel value. Thus, the noise component included in the valid pixel is uniformly deleted, so that it is possible to precisely correct dark current irrespective of a level of the pixel signals from the OB pixels.

Since the sag occurs in a conventional example, it is necessary to subtract a reference value, which is added by a subtracter 12 in a previous stage, in a subsequent stage after sampling variation in the level again. Accordingly, two synchronization signals with different timing, which indicate the input timing of pixel signals from OB pixels, are necessary for a negative feedback loop in a previous stage and a sampling and holding section 32, respectively.

On the other hand, since the sag does not occur in this embodiment, the pixel signal from the image sensor 70 is converted into the pixel value with a black level of zero just by subtracting the reference value from the pixel value output from the A/D converter 18 by the subtracter 36 in the subsequent stage. Therefore, the single synchronization signal, which indicates the input timing of the pixel signals from the OB pixels, is necessary only for the negative feedback loop. Therefore, it is possible to simplify the structure of the circuit.

<Supplementary Items of this Embodiment>

[1] In this embodiment, the PGA 62 is inserted between the comparator 26 and the switch 60 in series. The present invention, however, is not limited to this embodiment. The PGA 62 may be inserted between, for example, the hold circuit 16 and the D/A converter 20, or between the switch 60 and the D/A converter 20.

[2] In this embodiment, by way of example, the predetermined value "b" is a value in which the difference between a pixel value output from the A/D converter 18 and a reference value is 15% of the reference value, when the reference value is regarded as a standard (100%). In other words, when a convergence level is regarded as a standard (100%), large gain (gain "L" and "M") is used for accelerating clamping till the difference between the convergence level and a hold level is reduced to 15%. The present invention, however, is not limited to this embodiment. The large gain may be used for accelerating the clamping till the difference between the convergence level and the hold level is reduced to, for example, 10% or 20%.

Figure 4:
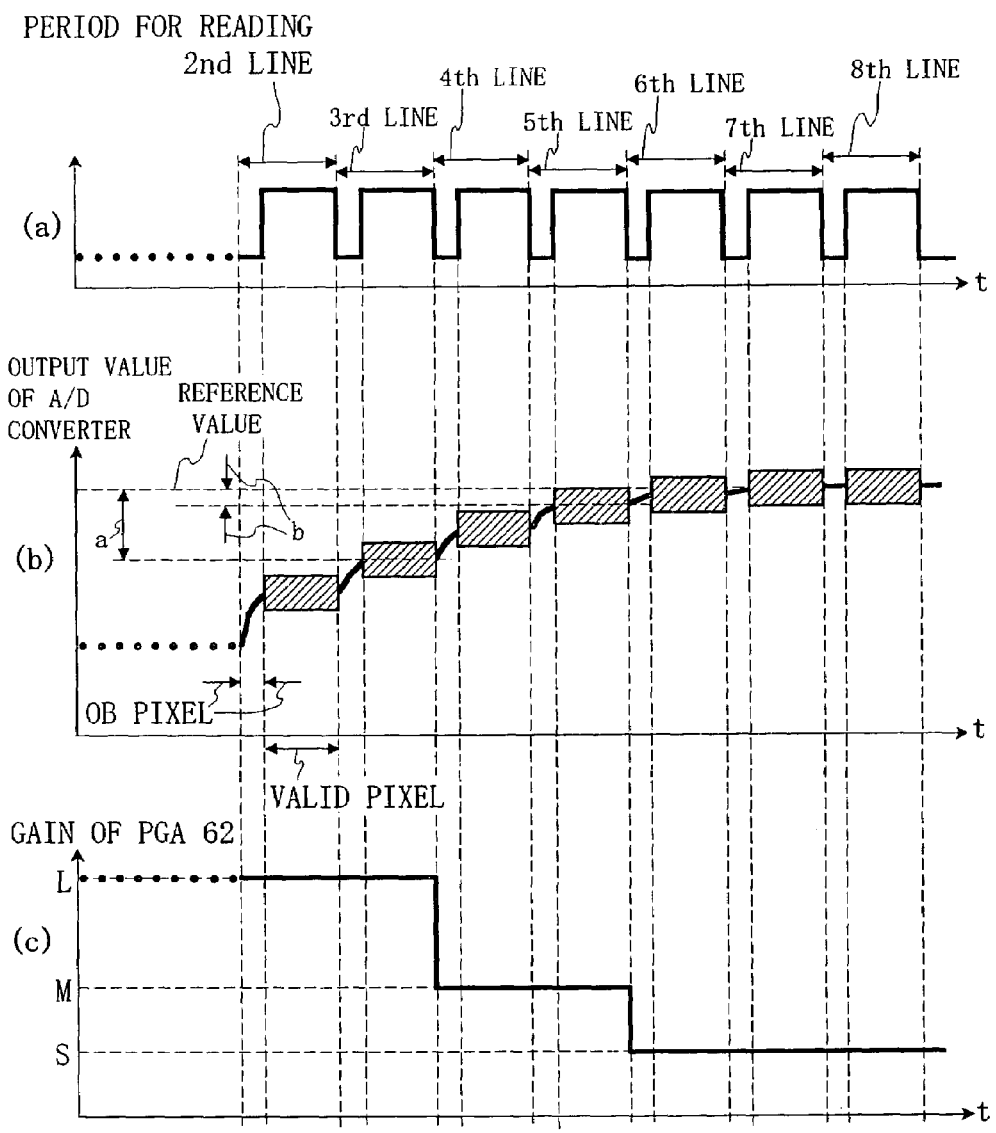
FIG. 4 is another example of the timing chart showing the gain of the PGA 62 of FIG. 2.

[3] In this embodiment, by way of example, a hold level reaches a convergence level before completing the readout of pixel signals from the OB pixels in the first row, namely, an output pixel value is changed in the first row. The present invention, however, is not limited to such an embodiment. There is a case where pixel output of several rows is read out before the hold level reaches the convergence level, namely, the output pixel values vary in a single image. Also in this case, it is possible to shorten clamp time compared to the conventional art by varying the gain of the PGA 62 as in the case of this embodiment. FIG. 4 shows an example of a timing chart of the gain of the PGA 62 according to this case.

In the example of FIG. 4, pixel output of each row is read out in order of the OB pixels and the valid pixels. The switch 60 is turned on while the pixel output of the OB pixels is read out, and is turned off while the pixel output of the valid pixels is read out. While the pixel output of the OB pixels is read out, the PGA 62 varies its gain in accordance with the absolute value of a pixel value output from the comparator 26.

While the switch 60 is on, and the absolute value of the pixel value output from the comparator 26 (the difference between an output value from the A/D converter 18 corresponding to the pixel output from the OB pixels and a reference value) is equal to or more than the predetermined value "a" (up to a third row in this example), the PGA 62 sets the gain at "L" as shown in FIG. 4(c). In this period, a hold level of the hold circuit 16 rapidly approaches a convergence level.

In a period of time after this when the switch 60 is on, if the absolute value of the pixel value output from the comparator 26 becomes less than the predetermined value "a", the PGA 62 lowers the gain from "L" to "M" in synchronization with this, and maintains it (fourth and fifth rows in this example).

In a period of time after this when the switch 60 is on, if the absolute value of the pixel value output from the comparator 26 becomes less than the predetermined value "b", the PGA 62 lowers the gain from "M" to "S" in synchronization with this, and maintains it (from a sixth row in this example). After that, the hold level reaches the convergence level (a period of reading out the pixel output from the OB pixels in an eighth row in this example), and the pixel value output from the comparator 26 becomes zero. In an embodiment shown in FIG. 4, as described above, it is possible to obtain similar effect to the embodiment shown in FIG. 3.

Figure 5:
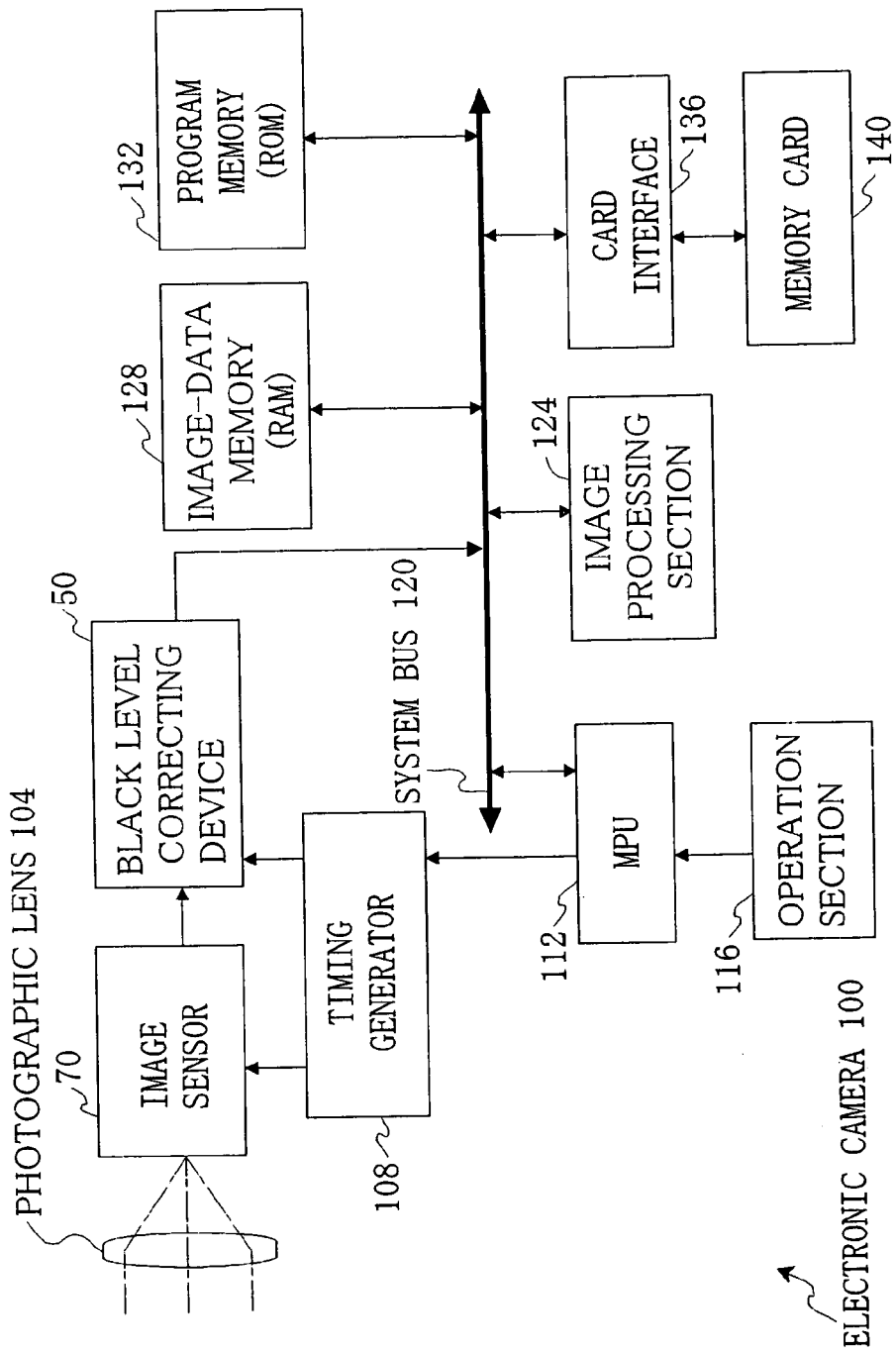
FIG. 5 is a block diagram of an electronic camera in which the black level correcting device according to the embodiment is installed.

[4] As shown in FIG. 5, the black level correcting device according to this embodiment may be installed in the electronic camera. In the drawing, an electronic camera 100 has a photographic lens 104, the image sensor 70, the black level correcting device 50, a timing generator 108, an MPU (micro processing unit) 112, an operation section 116, a system BUS 120, an image processing section 124, an image-data memory 128, a program memory 132, a card interface 136, and an exchangeable memory card 140. The MPU 112 controls the system of the electronic camera 100 by use of the system BUS 120. The operation section 116 has a button group for setup including a power button, a release button, and the like (not illustrated).

The black level correcting device 50 receives an analog pixel signal from the image sensor 70 together with an OB timing signal from the timing generator 108, and outputs digital pixel values. The pixel values of all valid pixels after exposure are subjected to image processing in the image processing section 124 as image data, and then recorded on the memory card 140. A major feature of the electronic camera 100 is that the black level correcting device 50 according to the present invention is installed therein, and explanation about the detailed imaging operation thereof will be omitted because it is publicly known.

The invention is not limited to the above embodiments and various modifications may be made without departing from the spirit and scope of the invention. Any improvement may be made in part or all of the components.

What is claimed is:

1. A black level correcting device comprising an A/D converting section converting a result of subtracting a feedback signal from an analog pixel signal output from an image sensor into a digital signal, and outputting the digital signal as a pixel value, and a feedback controlling section generating said feedback signal, wherein said feedback controlling section includes:

a comparator outputting a difference between a standard value and the pixel value output from said A/D converting section as a digital feedback signal;

a holding section having a maintaining section and carrying out clamp operation, which brings a maintaining level of said maintaining section near to a level of said feedback signal in response to said feedback signal output from said comparator, while a pixel signal from an optical black pixel of said image sensor is output, and said holding section maintaining and outputting the maintaining level of said maintaining section while a pixel signal from a valid pixel of said image sensor is output;

a subtracting section subtracting the maintaining level of said holding section from said analog pixel signal before said analog pixel signal is input into said A/D converting section; and a feedback gain adjusting section inserted into a feedback loop of said feedback signal in series and starting to multiply said feedback signal by clamp accelerating gain which is larger than 1 in synchronization with starting readout of the pixel signal from said optical black pixel, and multiplying said feedback signal by gain which is smaller than said clamp accelerating gain before completion of said clamp operation.

2. The black level correcting device according to claim 1, further comprising a standard value subtracting section subtracting said standard value from the pixel value output from said A/D converting section, and outputting the pixel value after the subtraction as a black level-controlled pixel value.

3. An electronic camera comprising an image sensor, and a signal processing section taking an image of a subject using said image sensor to generate image data, wherein said signal processing section includes the black level correcting device according to claim 1 for processing an analog pixel signal output from said image sensor.

4. An electronic camera comprising an image sensor, and a signal processing section taking an image of a subject using said image sensor to generate image data, wherein said signal processing section includes the black level correcting device according to claim 2 for processing an analog pixel signal output from said image sensor.

* * * * *